Sept. 24, 1940.         A. J. BURKLIN                2,215,520
                    WATER HEATER AND CONTROL
                      Filed Sept. 15, 1937            2 Sheets-Sheet 1
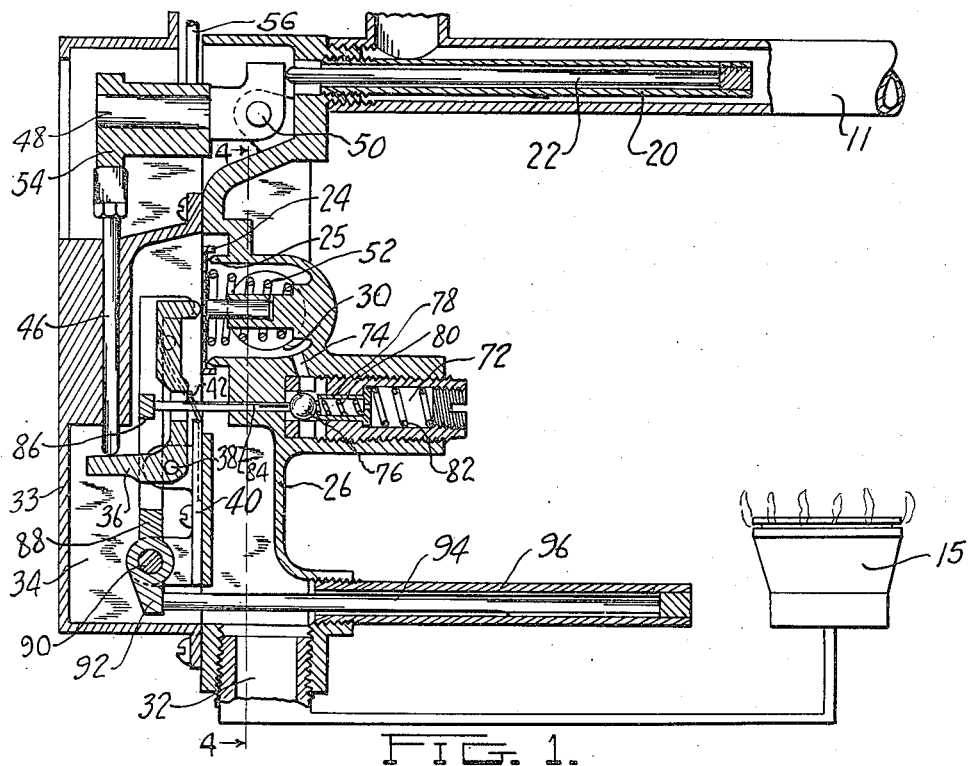
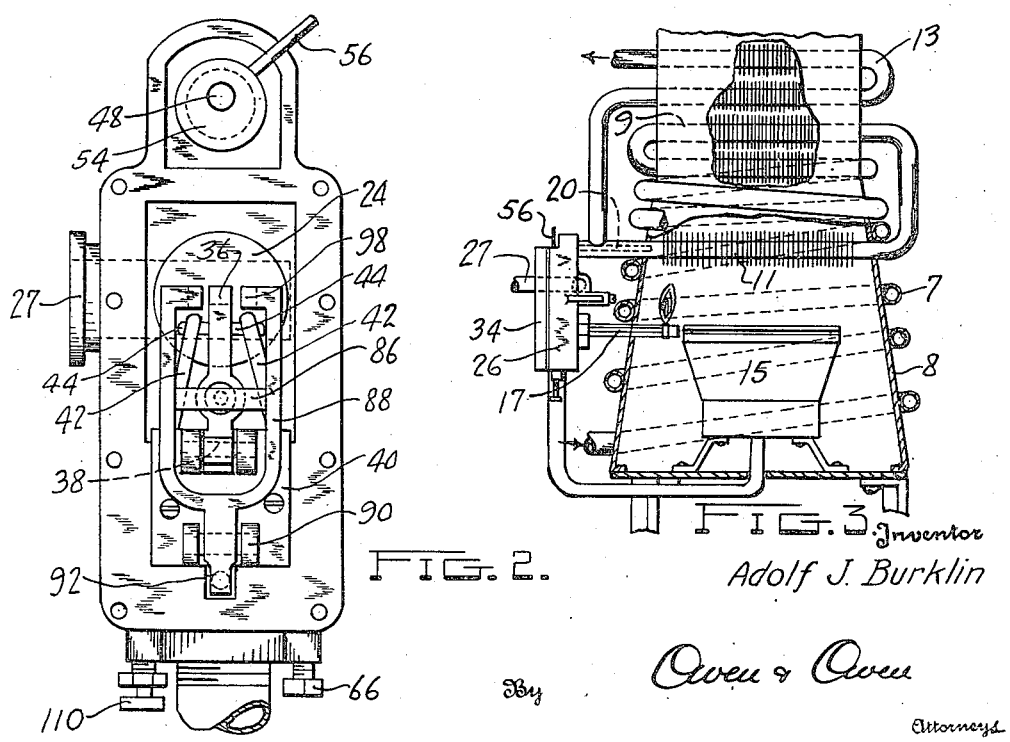
Inventor
Adolf J. Burklin
By Owen & Owen
Attorneys

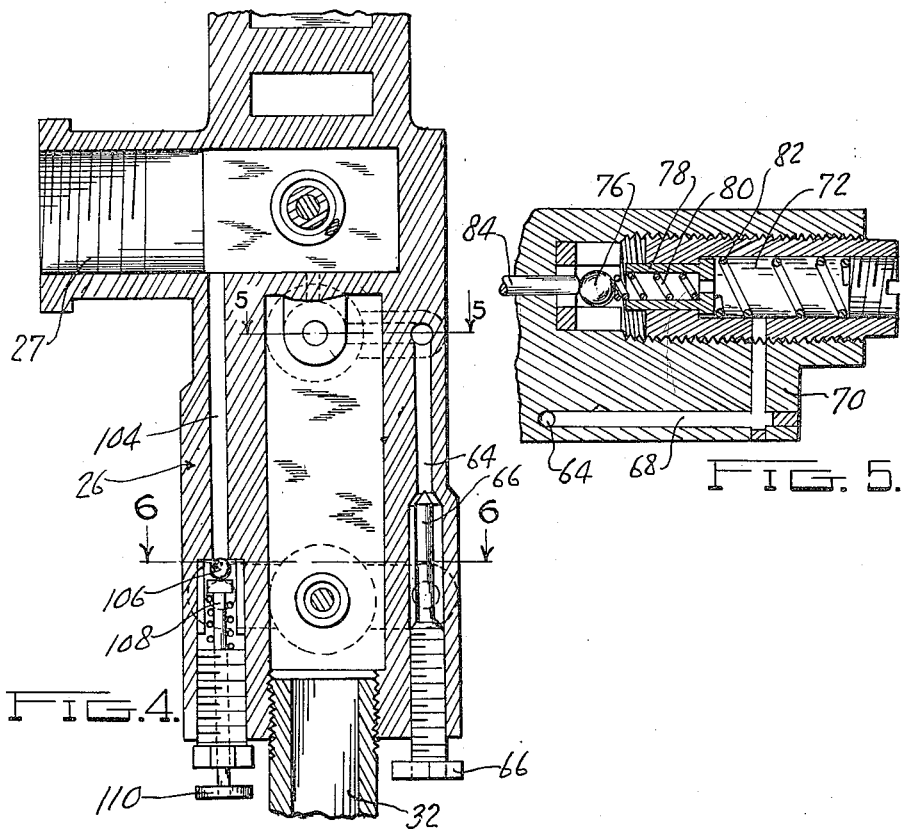
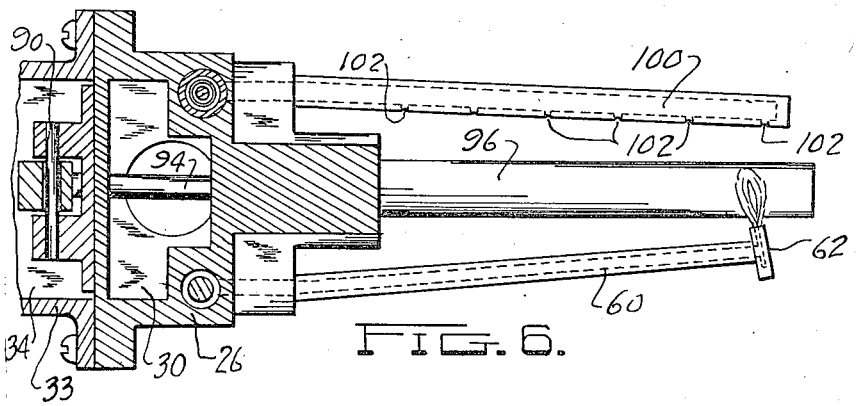

Patented Sept. 24, 1940

2,215,520

UNITED STATES PATENT OFFICE 2,215,520

WATER HEATER AND CONTROL

Adolf J. Burklin, Toledo, Ohio, assignor to The Burkay Company, Toledo, Ohio, a corporation of Ohio Application September 15, 1937, Serial No. 164,027

5 Claims. (Cl. 236—21)

This invention relates to thermostatic control of water heaters, and is more particularly directed to an apparatus combining a pilot light and main gas valve control with certain heater elements.

The primary object of the invention is the provision of a simple, directly operated thermostatic control for the gas supply of a water heater, which control has few parts and which is positive and efficient in operation.

Another object of the invention is the provision of a thermostatic control for an "instantaneous" water heater, in which the parts are related to the heater coils in such a manner as to eliminate the usual water operated valve.

Other objects and advantages of the invention will become apparent as the description proceeds, reference being had to the accompanying drawings, in which—

Figure 1 is a central vertical section of a thermostatic control embodying the present invention; Fig. 2 is a front elevation, with the cover 33, removed, of Fig. 1; Fig. 3 is a diagrammatical view of an installation showing the relation between the thermostatic parts, the burner and the heating coils; Fig. 4 is an end elevation of the thermostatic control, with parts broken away; Fig. 5 is a section on line 5—5 of Fig. 4, and Fig. 6 is a section on line 6—6 of Fig. 4.

Referring to the drawings, and particularly to Fig. 3, the control is shown in connection with a heater which includes a water passage including preheating coils 7 disposed on the exterior of a casing 8 and communicating with initial finned conduits 9 inside the casing adjacent the upper end thereof. A second finned conduit 11 passes through the central part of the casing below the conduits 9 and communicates therewith and with final finned conduits 13 from which the water is discharged to the house system. The purpose of the second conduit 11 and its disposition in the heating circuit will become more clearly apparent as the thermostatic system is described.

A gas burner 15 is disposed at the lower end of the casing 8 and is under the control of the thermostatic apparatus which operates in accordance with the temperature of the water in the intermediate or second conduit 11. A pilot burner 17 is placed in cooperative relation to the main burner 15 and below the conduit 11 so that water standing therein is kept at a predetermined temperature by the pilot flame. A reduction in temperature below the predetermined point causes the thermostat to admit gas to the main burner while a predetermined elevation of temperature closes this gas supply.

As shown in Fig. 1, a metallic temperature responsive sleeve 20, having a relatively high coefficient of expansion, is inserted into the end of the intermediate conduit 11 and carries a pencil 22 of material having a low coefficient of expansion in such a manner that the pencil is moved by expansion or contraction of the sleeve 20. The expansion and contraction of the thermostatic element 20 controls the opening and closing of a main gas valve 24 which cooperates with a seat 25 to open communication between a gas supply line 27 and a heater supply line 32. The valve 24 may be of any suitable type, but must have a close cooperation with its seat 25.

The valve seat 25 is formed in a body 26 which may be a metallic casting and which includes an inlet conduit 27 for gas which communicates with a chamber 30 behind the valve seat. The body 26 also has provision for the reception of a gas outlet pipe 32 adjacent its lower end which is connected to the main burner 15. A close fitting, gasketed cover 33 cooperates with the face of the body 26 to form a gas chamber 34 which communicates directly with the outlet pipe 32, and, when the valve 24 is open, with the inlet gas chamber 30.

The chamber 34 contains valve operating mechanism which includes a bell crank lever 36 pivoted, as at 38, to a plate 40 attached to the face of the body 26. One arm of the lever 36 bears directly against the face of the valve 24 and is forced thereagainst by a heavy leaf spring 42, which is held beneath the plate 40 and bears against pins 44 protruding from each side of the arm of the lever 36. The other arm of the bell crank lever extends laterally from the pivot point and is engaged by a stem 46 which has a reamed fit through an elongated boss formed in the cover 33 and extending outwardly therefrom to engage one end of a second bell crank lever 48 pivoted to the body 26, as at 50. The other end of the lever 48 engages the pencil 22, so that motion of the pencil is transmitted through the bell crank lever 48 and the stem 46 to the first bell crank lever 36. It will be seen that this motion will tend to move the bell crank lever and its heavy leaf spring 42 away from the face of the valve 24, which latter is then opened by a coil spring 52 bearing against the inlet face of the valve. This operation takes place whenever the temperature of the water standing in conduit 11 falls below the predetermined point, so as to cause contraction of the metallic sleeve 20. Gas then flows to the main burner 15 to heat the water. An adjustable temperature setting of this thermostatic mechanism is obtained through the medium of an eccentric sleeve 54 carried by the bell crank lever 48 and operated by a protruding handle 56. As the eccentric is moved about the lever 48 to contact the stem 46, it will be seen that more or less motion must be derived from pencil 22 before the first bell crank lever 36 will move away from the valve 24.

The thermostatic gas control mechanism also includes a "safety pilot" feature. The pilot light, as shown in Fig. 6, includes an elongated tube 60 having a small burner head 62 thereon. The tube 60 is threaded into the body 26 to communicate with a vertical passage 64 formed in the body and controlled by a needle valve 66. As shown in Fig. 6, the passage 64 extends upwardly and opens directly into a passage 68 formed in a rearwardly extending portion 70 of the body 26. The passage 68 communicates with a chamber 72 which, as shown in Fig. 1, is in controlled communication through a passage 74 with the gas chamber 30 behind the main control valve 24 so that it may be in constant communication with the gas supply regardless of the supply to the main burner 15. A suitable valve assembly controls the admission of gas from the passage 74 to the chamber 72, and hence to the pilot, and includes a ball valve 76 adapted to cooperate with a valve seat 78 but normally urged therefrom by a small coil spring 80. The valve seat 78 is purposely made movable rearwardly in Fig. 5, but is forced to the front of chamber 72 by a coil spring 82. The ball valve 76 may be moved against the seat 78 by a stem 84 to close the valve and cut off the gas supply to the pilot. This closing of the valve takes place only when the pilot is extinguished.

The ball valve control stem 84 extends through body 26, as shown in Fig. 1, and bears against a cross-bar 86 which extends between the legs of a yoke 88 pivoted at its lower end to a bracket 90 carried by the plate 40. A lower arm 92 extends downwardly from the yoke and engages a pencil 94 of material having a low coefficient of thermal expansion which is received in a metallic sleeve 96 having a high coefficient of thermal expansion. The sleeve 96 is threaded into the rear of the body 26, as shown in Fig. 6, extends outwardly to a point adjacent the pilot burner 62, so that the flame from the pilot heats and expands the sleeve 96.

The yoke 88 extends upwardly in the gas chamber and has inwardly extending fingers 98 on its upper end in position to contact the valve 24 whenever the yoke is moved in a clockwise direction in Fig. 1. Thus, the valve may be held closed by the fingers 98 even through the lever 36 be moved from contact with the valve by reason of the actuation of the thermostatic sleeve 20 and its associated lever system. The movement of the yoke fingers 98 against the valve 24 takes place whenever the sleeve 96 contracts by reason of a reduction in temperature due to the absence of a flame in the pilot burner 62. Thus, when the sleeve contracts, the pencil 94 abuts against the extension 92 of the yoke and moves the latter about its pivot 90, so that the fingers 98 abut the valve 24. This same movement causes the cross-bar 86 to force the valve control stem 84 to seat the ball valve 76 and cut off the supply of gas to the pilot burner. With the parts in this position, even though the main thermostatic element 20 should contract and tend to cause an opening of the main valve, no gas will flow to the main burner 15 since the valve 24 will be held closed by the fingers 98 of the yoke 88.

A starting burner consisting of a perforated tube 100, having a series of burner ports 102 formed in its wall, is provided adjacent the sleeve 96. Gas is supplied to the sleeve 100 through a vertical passage 104 in the bodly 26, this passage being controlled by a ball valve 106 normally urged against its seat by a spring pressed stem 108. The stem 108 extends out of the body 26 to terminate in a finger button 110, so that as the button and stem are moved manually downward in Fig. 4, the ball valve 106 will permit gas to flow from the gas inlet to the starter burner 100.

The user, to start the heater after extinguishment of the pilot, applies a match to burner 100 after opening the gas supply to the burner by pulling down the button 110. This button is held down until the tube 96 becomes sufficiently heated to release the pressure of pencil 94 on the bottom lever of yoke 88, so that the latter moves counter-clockwise in Fig. 1. This opens the ball valve 76 and permits gas to flow to the pilot, which will then start. When the pilot starts, the entire heater is then in operable condition.

The pilot flame from burner 62 is maintained at a point sufficient to furnish heat to conduit 11 and maintain water in this conduit at a predetermined temperature which corresponds to the attained temperature of the water as it is heated by the main burner during its flow through the system. The temperature of the water in conduit 11 is such that the thermostatic sleeve 20 is expanded to such a point that the main burner valve 24 is closed. A temperature of approximately 90° has been found to exist in the water in this conduit as it is heated during its passage through the system. A reduction in temperature, such as will occur when a faucet in the hot water line is open to cause relatively cold water to come in contact with the sleeve 20 causes an opening of the main valve 24 and hence starts the main burner 15 to heat the water. This heating continues until the temperature in the conduit 11 is raised again to the predetermined temperature, at which time the expansion of the sleeve 20 permits the heavy leaf spring 42 to close the main valve. With water flowing at 90° in the intermediate water conduit, the water flowing from the final conduit 13 will attain a temperature of, say, 130°. It will be appreciated that no snap action takes place in this construction since the close relationship of the parts causes the thermostatic sleeve 20 to act as a modulator and regulate the degree of opening of the valve 24 and hence the quantity of gas supplied to the main burner 15. Thus, as the water in conduit 11 approaches the predetermined temperature setting, the supply of gas will be gradually shut down, and, if the water flow continues, the burner will probably stay on. If, however, the water is shut off, the water will quickly heat up to the predetermined maximum and cause the thermostat to close the gas supply to the main burner. The heat from the pilot burner is sufficient to maintain this temperature until the water flow again is started.

It will be appreciated that the present system eliminates the necessity for the usual "water motor" by which the mechanical forces derived from the flow of water in the system actuates the gas supply valve for the main burner. This is accomplished largely by maintaining a predetermined temperature in conduit 11 by the heat from the pilot flame 62 which, in most heaters, is wasted.

While the invention has been described in connection with the particular form and disposition of the parts, it should be readily appreciated that various changes will suggest themselves to those skilled in the art. It should be expressly understood that such modifications and changes are contemplated by the present invention as defined by the appended claims.

Having thus described my invention, what I claim as new, and desire to secure by United States Letters Patent, is:

1. In a water heater, a main burner, a pilot burner adjacent the main burner, a water conduit overlying said burners, a fuel conduit for the main burner, a by-pass conduit connecting the fuel conduit and the pilot burner, a valve in the fuel conduit leading to the main burner, a valve in the by-pass conduit leading to the pilot burner, spring means biased to move the main valve to open position, a spring pressed lever adjacent the main valve for closing the latter against the action of said spring means, a thermostat in the water conduit for actuating the spring pressed lever to permit the spring means to open the valve when the temperature of the water drops below a predetermined point, a second thermostat adjacent the pilot burner for closing said valves independently of the spring pressed lever when the pilot burner is extinguished, whereby to prevent the passage of fuel through said valves to said respective burners.

2. In a water heater, a main burner, a pilot burner adjacent the main burner, a water conduit overlying said burners, a fuel conduit for the main burner, a by-pass conduit connecting the fuel conduit and the pilot burner, a main valve in the fuel conduit leading to the main burner, a valve in the by-pass conduit leading to the pilot burner, first spring means biased to move the main valve to open position, second spring means biased to move the main valve to closed position against the tension of said first spring means, a thermostat in the water conduit for releasing the second spring means when the temperature of the water rises above a predetermined point and thereby to close said main valve and conversely, when the temperature of the water drops below said predetermined point to overcome said second spring means whereby the main valve is opened by said first spring means, and a second thermostat adjacent the pilot burner for closing said main valve and said by-pass conduit valve independently of the first named thermostat when the pilot burner is extinguished, whereby to prevent the passage of fuel through the valves to the respective burners.

3. In a water heater, a main burner, a pilot burner adjacent the main burner, a water conduit overlying said burners, a fuel conduit for the main burner, a by-pass conduit connecting the fuel conduit and the pilot burner, a valve in the fuel conduit leading to the main burner, first spring means biased to move the valve to open position, second spring means biased to move the main valve to closed position against the tension of said first spring means, a thermostat in the water conduit for releasing the second spring means when the temperature of the water rises above a predetermined point and thereby to close said valve and conversely, when the temperature of the water drops below said predetermined point to overcome said second spring means whereby the valve is opened by said first spring means, and a second thermostat adjacent the pilot burner for closing said valve independently of the first named thermostat when the pilot burner is extinguished, whereby to prevent the passage of fuel through the valve to the respective burners.

4. A water heater in accordance with claim 2, wherein the second spring means includes a lever.

5. A water heater in accordance with claim 3, wherein the second spring means includes a lever.

ADOLF J. BURKLIN.